(12) United States Patent
Srinivasan et al.

(10) Patent No.: US 8,599,854 B2
(45) Date of Patent: Dec. 3, 2013

(54) METHOD OF IDENTIFYING DESTINATION IN A VIRTUAL ENVIRONMENT

(75) Inventors: Udayakumar Srinivasan, Fremont, CA (US); Srinivas Sardar, Fremont, CA (US); Joseph Michaelsamy Swaminathan, Union City, CA (US); Ashwin Deepak Swaminathan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 513 days.

(21) Appl. No.: 12/762,210

(22) Filed: Apr. 16, 2010

(65) Prior Publication Data

US 2011/0255538 A1     Oct. 20, 2011

(51) Int. Cl.
*H04L 12/28*     (2006.01)
*H04L 12/56*     (2011.01)

(52) U.S. Cl.
USPC .................. 370/392; 370/395.21; 370/395.31

(58) Field of Classification Search
USPC ............................... 370/392, 395.21, 395.31
See application file for complete search history.

(56) References Cited

U.S. PATENT DOCUMENTS

| | | | |
|---|---|---|---|
| 6,247,057 B1 | 6/2001 | Barrera, III | |
| 6,286,040 B1 | 9/2001 | Durham et al. | |
| 6,363,081 B1 | 3/2002 | Gase | |
| 6,717,914 B1 | 4/2004 | Hamami | |
| 6,760,804 B1 | 7/2004 | Hunt et al. | |
| 7,222,173 B2 | 5/2007 | Goodman | |
| 7,516,211 B1 | 4/2009 | Gourlay et al. | |
| 7,607,129 B2 | 10/2009 | Rosu et al. | |
| 8,027,354 B1 * | 9/2011 | Portolani et al. | 370/431 |
| 8,102,781 B2 * | 1/2012 | Smith | 370/252 |
| 2003/0014524 A1 | 1/2003 | Tormasov | |
| 2003/0200247 A1 * | 10/2003 | Banzhaf et al. | 709/1 |
| 2005/0108723 A1 | 5/2005 | Burckart et al. | |
| 2005/0182853 A1 | 8/2005 | Lewites et al. | |
| 2005/0232256 A1 | 10/2005 | White et al. | |
| 2006/0230219 A1 | 10/2006 | Njoku et al. | |
| 2006/0230407 A1 | 10/2006 | Rosu et al. | |
| 2007/0028244 A1 | 2/2007 | Landis et al. | |
| 2009/0276772 A1 * | 11/2009 | Garrett et al. | 718/1 |

(Continued)

FOREIGN PATENT DOCUMENTS

EP    1953972 A1    8/2008
WO    2009146165 A1   12/2009

OTHER PUBLICATIONS

International search report for international application No. PCT/US2011/032344 dated Jul. 25, 2011.

(Continued)

*Primary Examiner* — Ayaz Sheikh
*Assistant Examiner* — Blanche Wong
(74) *Attorney, Agent, or Firm* — Patterson & Sheridan, LLP

(57) ABSTRACT

Techniques are described for identifying destinations in a virtual network by defining virtual entities such as a port profile as the destination for network policies, such as redirect or span to be a logical set of ports (i.e., ports belonging to a port-profile or a port group) where the members of the set of ports may be added/removed dynamically without requiring any changes to the network policy. Further, a network administrator (or other user) may predefine the destinations for a network policy even before some or all of the destinations are active on a given virtualized system. In such cases, the network policies may go into effect when the required entities become available.

22 Claims, 7 Drawing Sheets

(56) References Cited

U.S. PATENT DOCUMENTS

| | | | |
|---|---|---|---|
| 2009/0292858 A1* | 11/2009 | Lambeth et al. | 711/6 |
| 2010/0031253 A1* | 2/2010 | Adams et al. | 718/1 |
| 2010/0054260 A1 | 3/2010 | Pandey et al. | |
| 2010/0214949 A1* | 8/2010 | Smith et al. | 370/254 |

OTHER PUBLICATIONS

Mark Bakke et al., U.S. Appl. No. 12/584,010, filed Aug. 28, 2009, entitled "Policy Based Configuration of Interfaces in a Virtual Machine Environment".

* cited by examiner

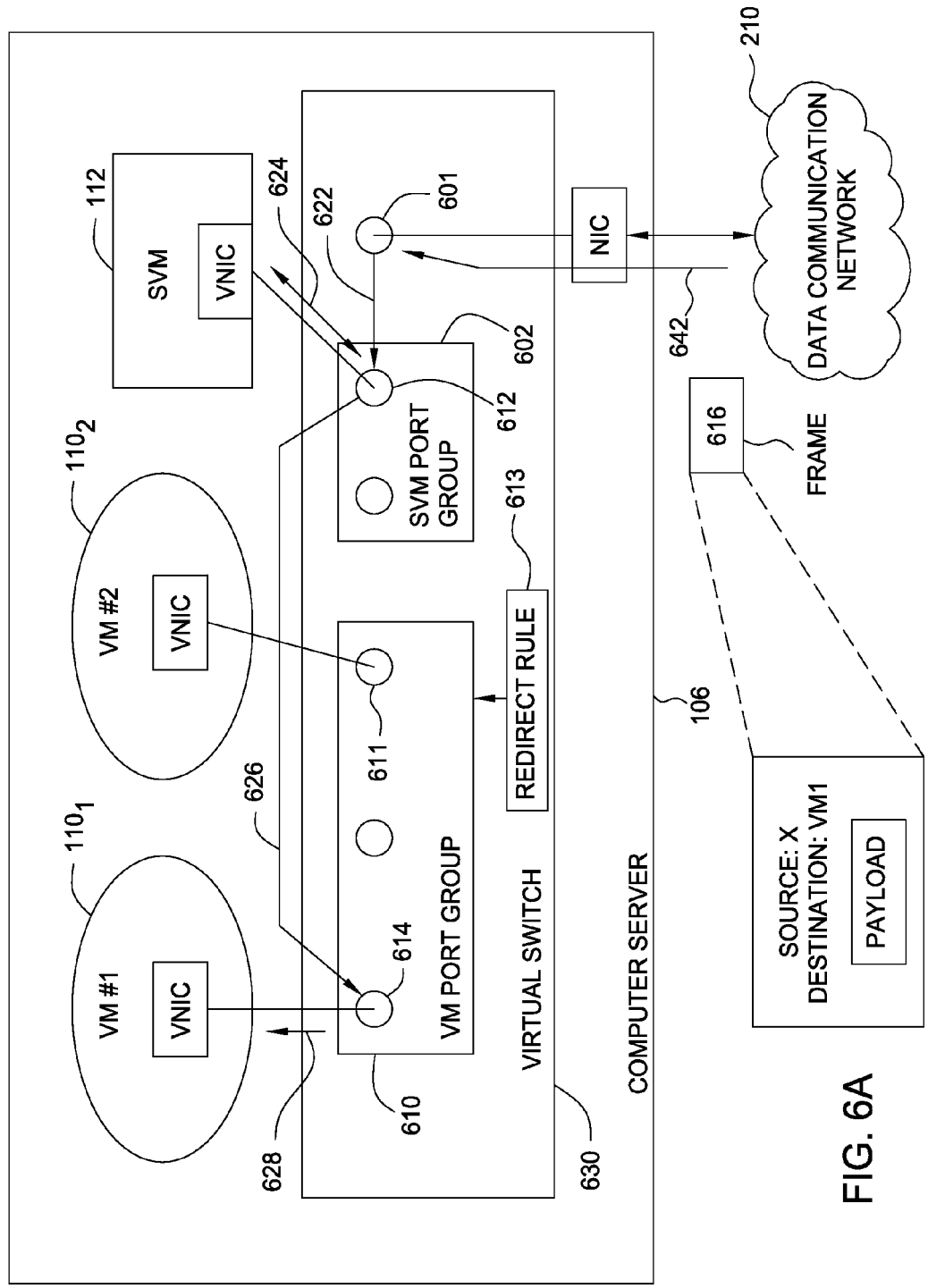

METHOD OF IDENTIFYING DESTINATION IN A VIRTUAL ENVIRONMENT

TECHNICAL FIELD

Embodiments described in this disclosure generally relate to communication networks, and more particularly, to routing network traffic in a virtualized environment.

BACKGROUND

Virtualization is a technology which allows one computer to do the job of multiple computers by sharing resources of a single physical computer system across multiple virtual systems. Through the use of virtualization, multiple operating systems and applications run on the same computer at the same time, thereby increasing utilization and flexibility of hardware. Virtualization allows servers to be decoupled from underlying hardware, thus resulting in multiple virtual machines sharing the same physical server hardware. In a virtual machine environment, a virtual switch provides network connectivity between virtual network interfaces on multiple virtualized systems and a physical network interfaces on a server.

In virtualized server environments, services such as firewall, intrusion prevention systems (IPS), intrusion detection systems (IDS), and monitoring services are becoming virtualized and are being deployed as virtual machines (VMs). A service virtual machine (SVM) may be configured to provide such services to each of the virtual machines running on the server. Services may also be run as a cluster of VMs in a collection of servers.

In some cases, users may desire to configure a virtualized switch to apply certain network policies (e.g., a redirect or span (mirror) policy) to frames forwarded to the virtual machines connected to that switch). Current mechanisms of specifying destination port explicitly based on port identification (ID) is cumbersome, since a destination port has to be specified per server per service. Similarly, when new servers are added to the network, a network administrator may need to configure a network policy to include the service ports of the services on the new server.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6B illustrate example packets destined to a virtual machine that are redirected or spanned to a service virtual machine based on a traffic destination rule.

DESCRIPTION

Overview

Figure 1:
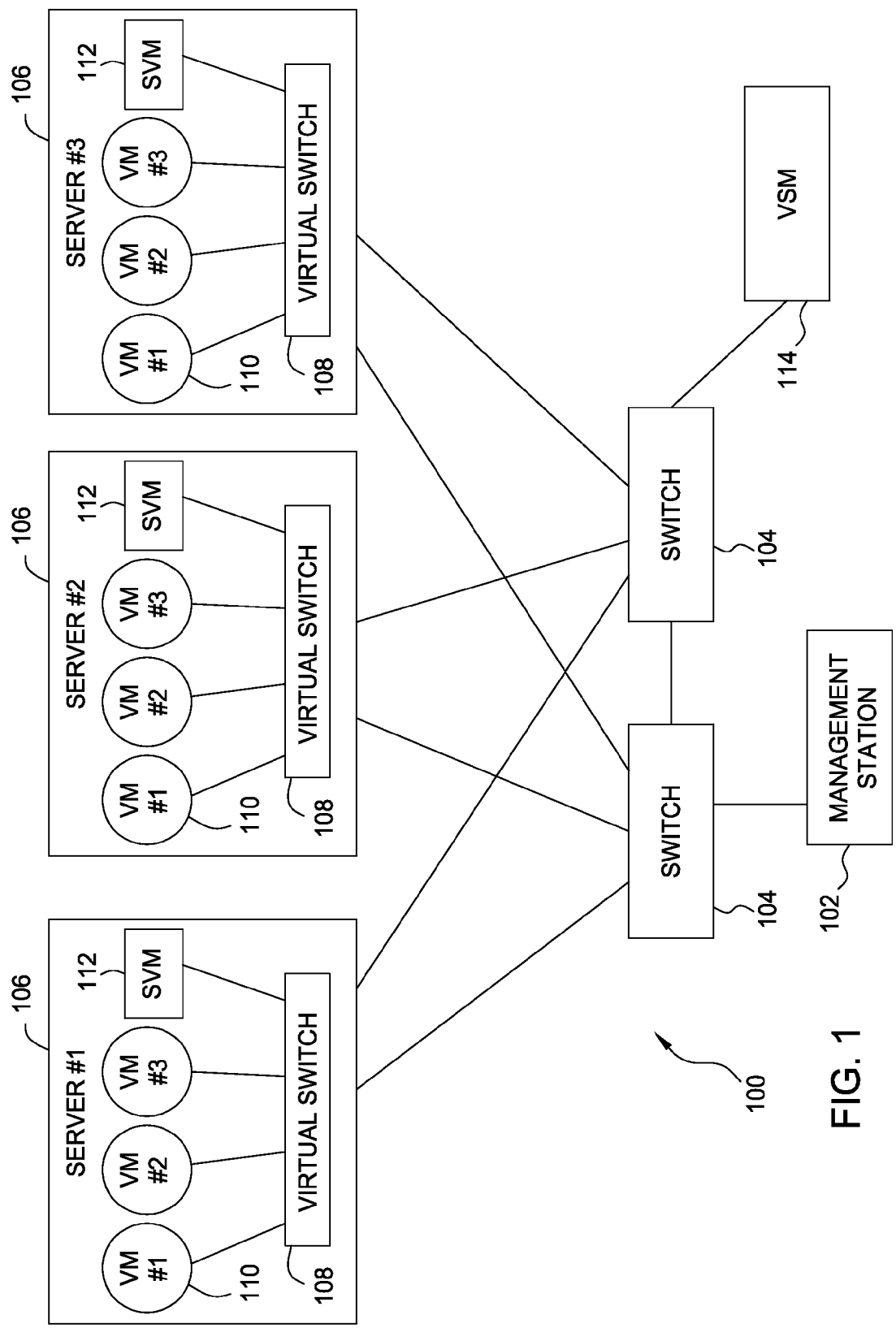
FIG. 1 illustrates an example of a network in which embodiments described herein may be implemented.

Certain embodiments of the present disclosure present methods for identifying destination and managing traffic flow on a virtualized server. In particular, for specifying network policies, such as network redirects or span polices, for traffic received by a virtual switch and destined to virtual machines logically connected to the virtual switch. One embodiment described herein sets forth a method. The method may generally include assigning a port profile to a first port group on a virtual switch executing on a computer server hosting a plurality of virtual machine instances. The port profile may include a network traffic destination rule. The method may also include connecting a virtual network interface on each of the virtual machine instance to a port in the first port group and forwarding network traffic addressed to one of the virtual network interfaces based on the traffic destination rule.

In a particular embodiment, the traffic destination rule is a redirect rule specifying to redirect network traffic addressed to one of the virtual network interfaces in the first port group to an active port in a second port group. In another embodiment, the traffic destination rule is a span rule specifying to copy network traffic addressed to one of the virtual network interfaces in the first port group to an active port in a second port group. Of course, the port profile may include multiple traffic destination rules, including span, redirect (and/or other rules). For example, the port profile may include one or more redirect rules to send selective traffic to the appropriate Service VMs. Additionally, the active port in the second port group may connect the virtual switch to a virtual machine instance which provides a network service, such as firewall service, an intrusion prevention system (IPS), an intrusion detection system (IDS) or a network traffic monitoring service for the plurality of virtual machine instances connected to the ports in the first port group.

Description of Example Embodiments

Embodiments described herein provide techniques for specifying a destination of a network policy, such as redirect or span to be a logical set of ports (i.e., ports belonging to a port-profile or a port group) where the members of the set of ports may be added/removed dynamically without requiring any changes to the network policy. Further, a network administrator (or other user) may predefine the destinations for a network policy even before some or all of the destinations are active on a given virtualized system. In such cases, the network policies may go into effect when the required entities become available.

Certain embodiments provide flexibility for the entities in a virtual environment to move from one module to another, while honoring the network policies that govern the entities by dynamically adapting to the change. This may include reorienting the flow of traffic on the fly or identifying a destination in proximity. For example, if a network policy redirects the traffic destined to a virtual machine on a server to an SVM on the same server, when the virtual machine moves to a new server, the traffic should be redirected to an SVM on the new server rather than the old server. The proposed method largely simplifies defining and deploying network policies.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Virtualization allows one computer to do the job of multiple computers by sharing the resources of a single computer across multiple systems. Software may be used to virtualize hardware resources of a computer, including, for example, the central processing unit (CPU), random access memory (RAM), hard disk, and network controller, to create a virtual machine that can run its own operating system and applications. Multiple virtual machines may share hardware resources without interfering with each other so that several operating systems and applications can run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

In a virtual environment, virtual switches provide networking connectivity between virtual machine interfaces and physical interfaces on the servers. Each server may include many virtual machines and a single virtual switching domain may encompass many servers. A network administrator typically configures the virtual switches and the connectivity constraints for the virtual ports on the virtual switch while a system (server) administrator configures the virtual machines and identifies the virtual ports to which the virtual machine interfaces should be connected.

For certain embodiments, instead of identifying the entities involved in the Network Policy by an identifier, such as a port name, virtual local area network (VLAN) ID, module ID and so on, a "logical entity" may be predefined. In such a case, the network policies may refer to the logical entity instead of the identifiers associated with entities (i.e., with the port number). A logical entity might represent more than one entity. An entity may become a member of a logical entity either statically (e.g., by administrative operations) or dynamically (e.g., using discovery mechanisms).

Since more than one entity may be a member of a logical entity, the policies could define whether the network policy is effective for all or a subset of the members of a logical entity. For example, the logical entity may include a plurality of members (e.g. entities) that can be divided into a first subset and a second subset based on their characteristics. A network policy may be effective only on the first subset of entities.

For certain embodiments, a set of entities that belong to a logical entity may be ordered by another policy for sequential processing if necessary. The logical entity for example could be identified by a port-profile name.

A port profile provides a container used to define a common set of configuration policies (attributes) for multiple interfaces. The port profiles are associated with port configuration policies defined by the network administrator and applied to a large number of ports (referred to as a port group) as they come online in a virtualized environment.

FIG. 1 illustrates an example of a network 100 that may implement embodiments described herein. For simplification, only a small number of nodes are shown. The network 100 may be configured for use as a data center or any other type of network. It is to be understood that the network shown in FIG. 1 is only one example, and that the embodiments described herein may be employed in networks having different configurations and types of network devices. The network 100 shown in FIG. 1 includes physical switches 104 in communication with servers 106 and a management station 102.

The servers 106 are also in communication with a Virtual Supervisor Module (VSM) 114. The VSM may be located in a physical appliance (e.g., server) in communication with the servers 106 and management station 102 via physical switches 104, or the VSM may be a virtual appliance (e.g., virtual machine) installed at one of the servers or another server in the network. As shown, each server 106 includes a virtual switch 108 (referred to herein as a Virtual Ethernet Module (VEM)), and a collection of virtual machines 110, labeled as VM #1, VM #2, VM #3, etc. The virtual machines 110 share hardware resources without interfering with each other, thus enabling multiple operating systems and applications to execute at the same time on a single computer. A virtual machine monitor such as hypervisor dynamically allocates hardware resources to the virtual machines 110. In the example of FIG. 1, server #1, server #2 and server #3 have three virtual machines, each server being physically separate from the other servers. The virtual machines 110 may each be moved between servers based on traffic patterns, hardware resources, or other criteria.

Additionally, each server includes one virtual machine referred to a service virtual machine (SVM) 112. The SVM 112 may be configured to provide a variety of services for network traffic destined for one of the VMs 110 on that serve 106. For example, the SVM 112 may provide firewall, intrusion prevention systems (IPS), intrusion detection systems (IDS), and monitoring services, among others. In one embodiment, a single SVM 112 is spawned for each physical server 106, allowing a given SVM 112 to provide services for the VMs on that server 106. Alternatively, such services may be provided by a cluster of VMs in a collection of servers. In one embodiment, network traffic destined for a VM 110 may be redirected or mirrored (spanned) to the SVMs 112, as specified by a network policy stored in a port profile (and applied to a port group on the virtual switch 108).

The VSM 114 is configured to provide control plane functionality for the virtual machines. The virtual switch 108 provides switching capability at the server and operates as a data plane associated with the control plane of the VSM. The VSM and virtual switch (VEM) 108 operate together to form a distributed virtual switch as viewed by the management station 102.

Figure 2:
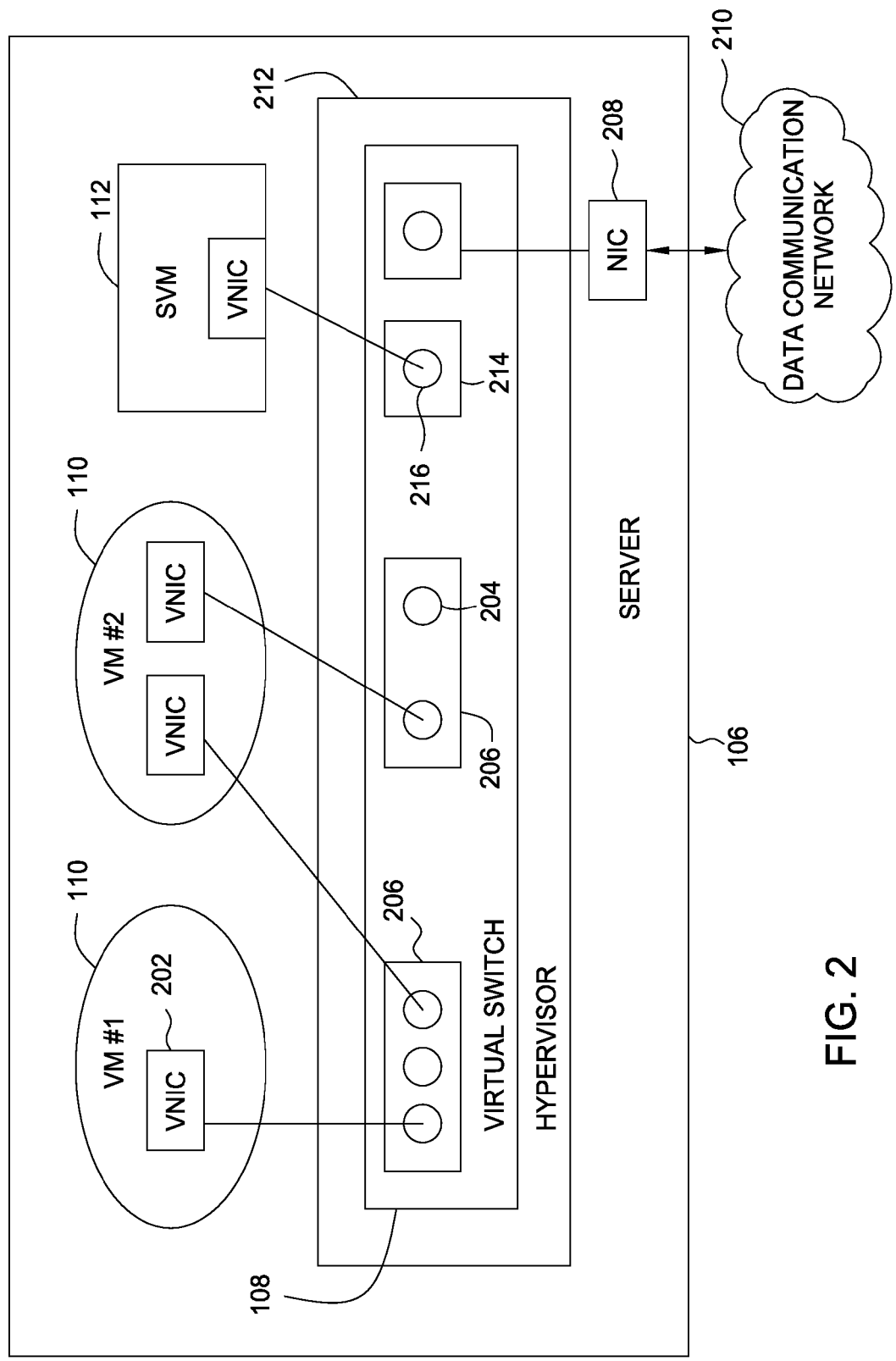
FIG. 2 illustrates an example server in a virtual network environment, according to certain embodiments of the present disclosure.

FIG. 2 illustrates an example server in a virtual network environment, according to certain embodiments of the present disclosure. The VMs 110 and the SVM 112 communicate with the virtual switch 108 via virtual network interface cards (VNICs) 202 which connect to a virtual Ethernet module (VEM) provided by the virtual switch 108. The SVM 112 is connected to a port 216 that is part of a port group 214 which is associated with an SVM port profile The switch 108 includes an Ethernet port 204 for each physical network interface card. A group of ports, generally referred to as a 'port group' 206 on the switch may share similar specifications (i.e., share the same port profile). The virtual switch communicates with the network 210 via the physical network interface card 208. The virtual switch routes traffic between the VMs 110, and SVM 112 and the physical network interface card 208. A hypervisor 212 monitors the virtual switch and dynamically allocates hardware resources to the virtual machines 110.

Figure 3:
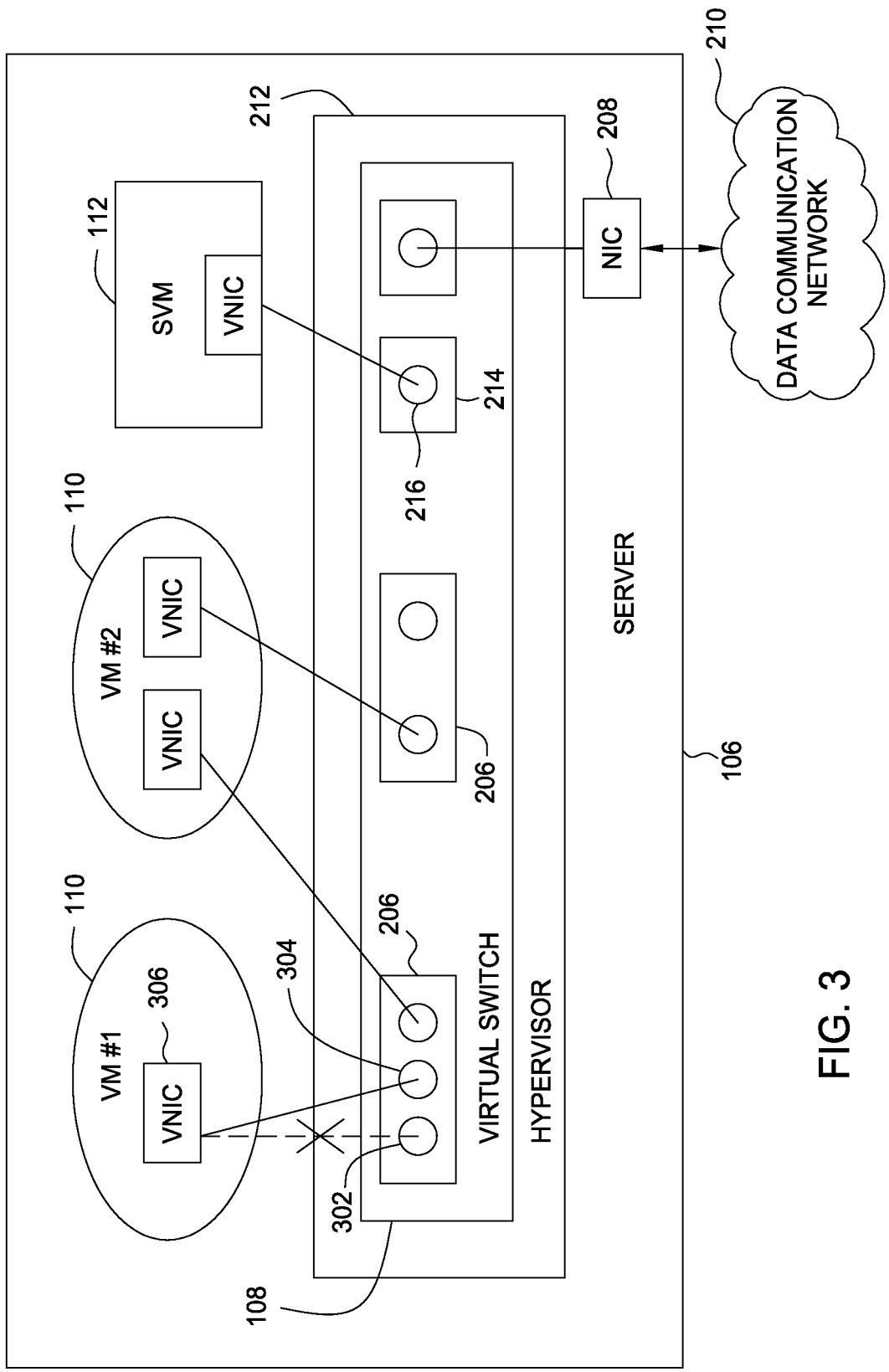
FIG. 3 illustrates an example scenario in which a virtual machine on a server disconnects from a port and reconnects to another port in the same port group possibly on a different server, according to certain embodiments of the present disclosure.

FIG. 3 illustrates an example scenario in which a virtual machine on a server disconnects from a port and reconnects to another port in the same port group possibly on a different server, according to certain embodiments of the present disclosure. As shown, a VNIC interface 306 on VM#1 110, initially connected to a port 302 on the virtual switch 108, is disconnected from the port 302 and reconnected to port 304, which belongs to the same port group. Therefore, the traffic destined to the VNIC interface 306 on VM#1 is forwarded to port 304 and any network policies specified for the port profile bound to port group 206 are applied to the traffic. For example if a network policy specified that traffic destined to port 302 should be redirected to the SVM 112, after reconnecting the VNIC 306 to the port 304, the traffic destined to the port 304 will also be redirected to the SVM 112.

For certain embodiments, if the VNIC interface on a VM disconnects from a port on a virtual switch on a server and moves to a port in the same port group on a virtual switch on a different server, similar network policies are applied to the traffic sent to the VM over the new port. The traffic destined to the VNIC interface will be directed to the new server and the network policies such as redirect or span that used to redirect or mirror the traffic to an SVM on the old server, will automatically redirect the traffic to an SVM on the new server. This happens because the destination for the network policies such as redirect or span is defined as a port profile (such as an SVM port profile) rather than a specific ID of the SVM on the old server.

Figure 4:
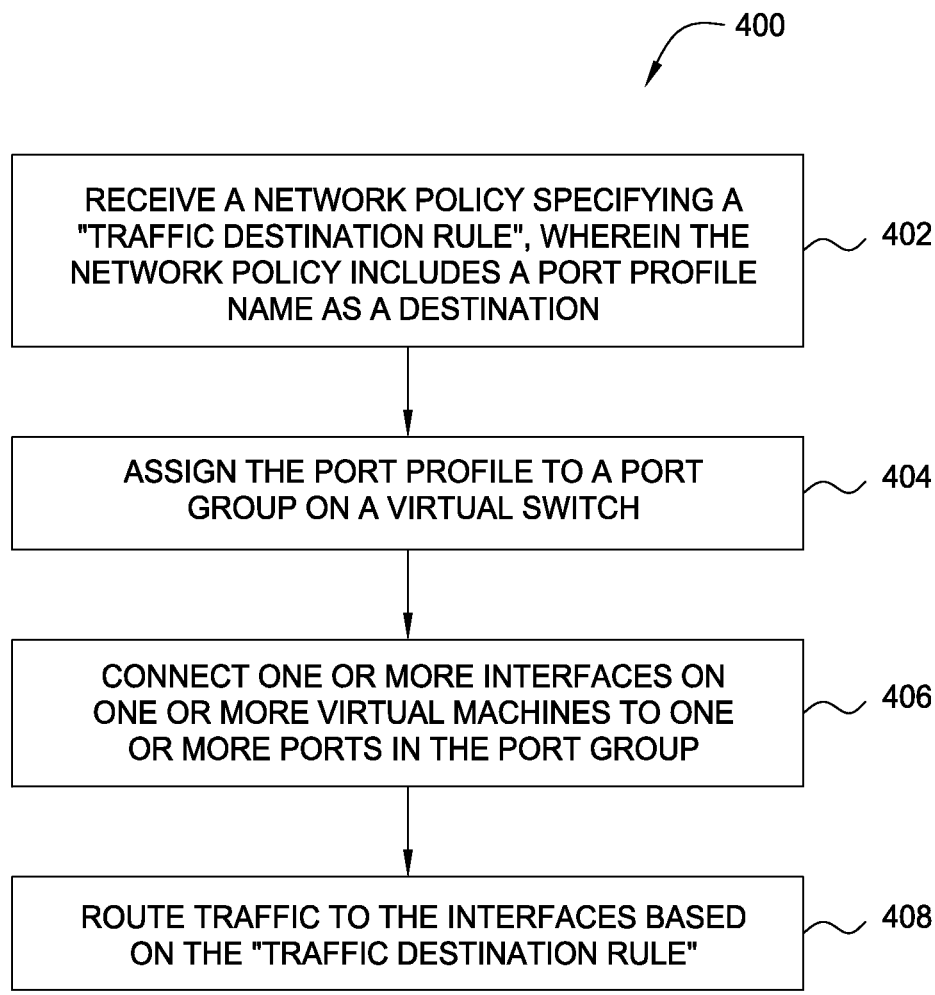
FIG. 4 illustrates example operations for identifying destinations in a virtual network, according to certain embodiments of the present disclosure.

FIG. 4 illustrates a method for identifying destinations in a virtualized network, according to certain embodiments of the present disclosure. At 402, a virtual switch may receive a network policy (e.g., a redirect policy or a span/mirroring policy) specifying a traffic destination rule. The network policy may include a port profile name as a destination for network traffic subject to the network policy. At 404, the port profile is assigned to a port group on a virtual switch. For example, an SVM port profile may be assigned to a port connected to an instance of SVM 112 (i.e., to a VM on a server providing certain services such as firewall, intrusion prevention systems (IPS), intrusion detection systems (IDS), and monitoring services). Note, the SVM 112 need not be instantiated when the port profile is created and assigned to one or more ports in a port group.

Similarly, a VM port profile may be assigned to a group of ports on the virtual switch used to connect multiple VMs 110 to the virtual switch (See FIG. 2). Such a port profile may specify a network policy such as a span (indicating that network traffic to the associated VM 110 should be mirrored to a port in the SVM port group) or a redirect policy (indicating that network traffic to the associated VM 110 should be redirected to a port in the SVM group). In such a case, when a VM 110 is spawned on the server, and a virtual network interface is connected to a port in the VM port group, the VEM (i.e., the virtual switch) may identify the network policy in the port profile and configure the port accordingly, e.g., to redirect all traffic sent to the VM port to the port on which the SVM 112 is connected. This approach avoids requiring the network administrator manually configure each traffic destination rule or network policy for VM on each server.

At 406, one or more interfaces on one or more virtual machines are connected to one or more ports in the port group. For example, in FIG. 2, a VNIC on VM#1 and a VNIC on VM#2 are connected to the ports in the VM port group 206 and SVM 112 is connected to a port in an SVM port group 206. At 408, traffic is routed to the interfaces based on the traffic destination rule specified the port profiles made active for the respective port groups.

Figure 5:
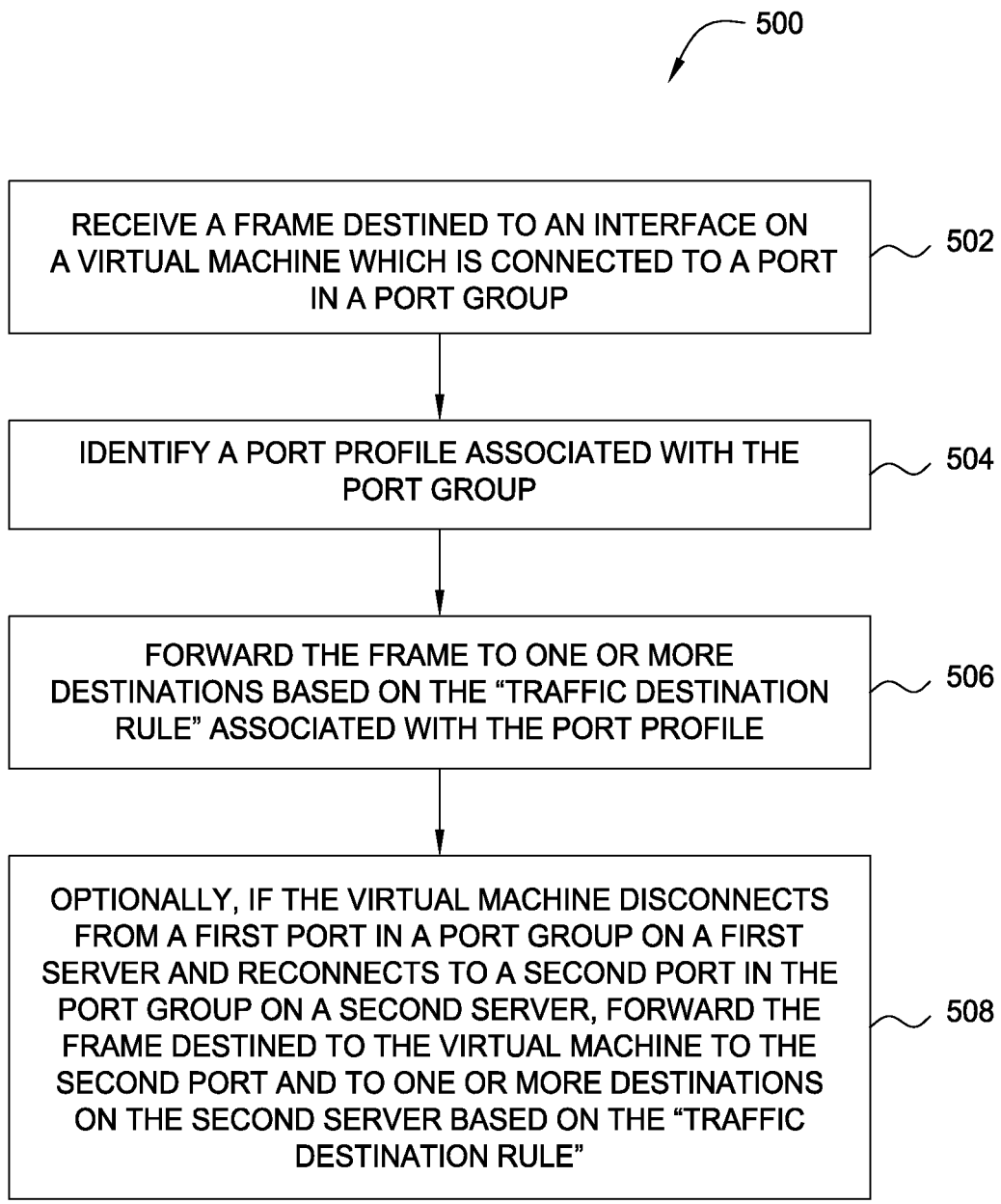
FIG. 5 illustrates example operations for processing network traffic in a virtual network, according to certain embodiments of the present disclosure.

FIG. 5 illustrates example operations 500 for processing network traffic in a virtual network, in accordance with certain embodiments of the present disclosure. FIG. 5 illustrates the step 408 in FIG. 4 in more detail. At 502, a virtual switch receives a frame destined to an interface on a virtual machine which is connected to a port in a port group. For example, the frame may be destined to the VNIC on VM#1 110 in FIG. 2. At 504, a port profile associated with the port group is identified. In one embodiment the port profile may be associated with a network policy that specifies a traffic destination rule. As discussed, the traffic destination rule may be redirect rule or span/mirror rule to a port with an SVM port profile.

At 506, in response to determining that the port has a traffic destination rule, the frame is processed according to the rule. For example, if the traffic destination rule specifies a redirect policy to redirect all traffic to an SVM, the virtual switch redirects frames originally addressed to the VM port to a port assigned the SVM port profile. Using FIG. 2 as an example, a frame addressed to VM #1 110 may be redirected to the SVM 112 instead of being forwarded to the VNIC on the VM #1 110, as the frame is addressed. In one embodiment, if no port on the virtual switch is active with the SVM port profile, then the virtual switch may send a frame addressed to the to the VM #1 110 to that VM.

Similarly, if the destination rule specifies to mirror all traffic to an SVM, the virtual switch forwards frames addressed to the VM port to the addressed destination, but, also forwards a copy of each frame to a port on which the SVM port profile is active. Using FIG. 2 as an example, a frame addressed to VM #1 110 may be forwarded to both the SVM 112 and the VNIC on the VM #1 110. In one embodiment, if no port on the virtual switch is active with the SVM port profile, then the virtual switch may still send a frame addressed to the to the VM #1 110 to that VM.

At 508, if the virtual machine is migrated from one physical server to another, frames addressed to the virtual machine are forwarded to destinations on the second server based on the traffic destination rule. For example, if the traffic destination rule is span/mirror to a port with an SVM port profile, a copy of the traffic will be sent to the SVM on the second server after the virtual machine is migrated to the second server.

Figure 6B:
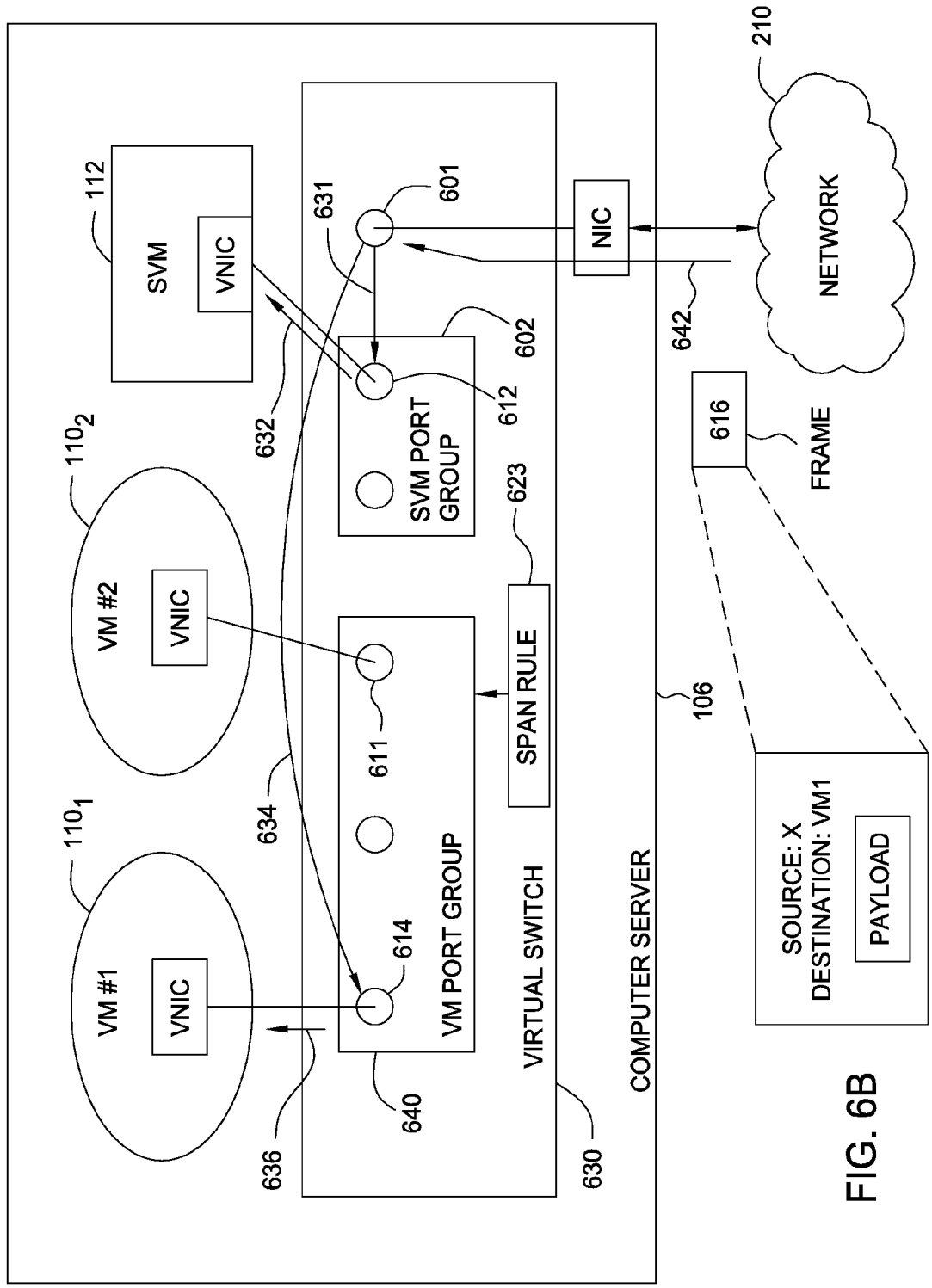

FIGS. 6A-6B illustrate example frames addressed to a virtual machine that are redirected or spanned to a service virtual machine based on a traffic destination rule.

FIG. 6A illustrates an example of a frame being redirected based on a port profile associated with a port on a virtual switch 630. As shown, a frame 616 is received by the virtual switch 630. Specifically, frame 616 is addressed to VM#1 110 and is received by the virtual switch on a port 601 (as represented by an arrow 642). In this example, frame 616 is addressed to VM#1 110, which is connected to a port 614 on the virtual switch 630. Also, ports 614 and 611 are associated with a port group 610. Assume that a port profile associated with port group 610 includes a redirect rule 613 specifying that traffic to any port in the port group 610 should be redirected to an SVM, or more specifically, to an active port in a port group associated with a port profile named "SVM." In this example, port 612 is active in SVM port group 602. Accordingly, the virtual switch 630 does not send frame 616 to the addressed destination of VM#1 110. Instead, the frame 616 is forwarded to a port 612 in the port group 602 (as represented by an arrow 622), where it is transmitted to the SVM 112 (as represented by an arrow 624). As noted above, the SVM 112 may be configured to provide a variety of services, as firewall, intrusion prevention systems (IPS), intrusion detection systems (IDS), and monitoring services. Once processed by the SVM 112, frame 616 is sent back towards port 612 on virtual switch 630, which then forwards it towards port 614, and ultimately VM#1 110 (as represented by arrows 624, 626, and 628).

FIG. 6B illustrates an example of a frame being mirrored based on a port profile associated with a port on a virtual switch. As shown, a frame 616 is received by a virtual switch 630. Specifically, frame 616 is addressed to VM#1 110 and is received by the virtual switch on a port 601 (as represented by an arrow 642). In this example, frame 616 is addressed to VM#1 110, which is connected to a port 614 on the virtual switch 630. Also, ports 614 and 611 are associated with a port group 640. However, unlike the redirect rule 613 illustrated in FIG. 6A, in FIG. 6B, a port group 640 is associated with a port profile specifying a span rule 623.

Assume the span rule 623 indicates that traffic to any port in the port group 640 should be mirrored to an SVM, or more specifically, to an active port (or port group) associated with a port profile named "SVM." In such a case, the virtual switch 630 sends frame 616 to the addressed destination of VM#1 110 on port 614, as shown in FIG. 6B by arrows 634 and 636). However, the frame 616 is also sent to port 601, thereby forwarding a copy of frame 616 to SVM 112, as (as represented by arrows 631 and 632). That is, frame 616 is forwarded according to the traffic destination rule (namely, the span rule 623). Further, because the rule is associated with the port profile, a network administrator need not manually configure the desired network mirroring for each virtual machine spawned on the server 106.

Advantageously, certain embodiments of the present disclosure describe a method to logically define destinations for a network policy (such as redirect or span), by using a logical set (i.e., port profile), even before the entities are present. The destinations for the network policy dynamically take effect when entities are added, enabled or moved. Thus, embodiments described herein provide simplify the provisioning of services in virtualized environments by supporting redirection to a port profile instead of a specific entity. Further, a network policy does not have to change when new SVMs are deployed or if SVMs are moved. Accordingly, embodiments described herein method minimizes the interactions between server and network administrators.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
 assigning a port profile to a first port group on a virtual switch executing on a computer server hosting a plurality of virtual machine instances, wherein the port profile includes network policies;
 connecting a virtual network interface on each virtual machine instance to a respective port in the first port group; and
 forwarding network traffic addressed to one of the virtual network interfaces in the first port group to a second port group based on one of the network policies, wherein a first one of the network policies is a span rule specifying to copy network traffic addressed to one of the virtual network interfaces in the first port group to an active port in the second port group.

2. The method of claim 1, wherein a second one of the network policies is a redirect rule specifying to redirect network traffic addressed to one of the virtual network interfaces in the first port group to an active port in the second port group.

3. The method of claim 2, wherein the active port in the second port group connects the virtual switch to a virtual machine instance providing at least one of a firewall service and an intrusion prevention system (IPS), for the plurality of virtual machine instances connected to the ports in the first port group.

4. The method of claim 1, wherein the active port in the second port group connects the virtual switch to a virtual machine instance providing at least one of a firewall service, an intrusion detection system (IDS), and a network traffic monitoring service for the plurality of virtual machine instances connected to the ports in the first port group.

5. The method of claim 1, further comprising:
 receiving, at the virtual switch, a frame addressed to one of the virtual network interfaces in the first port group;
 identifying the network policies in the port profile associated with the first port group; and
 forwarding, by the virtual switch, the frame addressed to the virtual network interface based on the network policies.

6. The method of claim 1, further comprising:
 migrating one of the virtual machine instances from the computer server to a second computer server;
 connecting the virtual network interface on the migrated virtual machine instance to a port group on a virtual switch on the second computer server; and
 forwarding network traffic addressed to the migrated virtual network interface based on a second network policy associated with the port group on the virtual switch on the second computer server.

7. A computing system, comprising:
 a processor; and
 a memory containing a virtualization program configured provide a virtual switch for a plurality of virtual machine instances on the computing system, the program, when executed on the processer, performs an operation comprising:
 assigning a port profile to a first port group on the virtual switch executing on the computing system, wherein the computing system hosts a plurality of virtual machine instances, and wherein the port profile includes network policies;
 connecting a virtual network interface on each virtual machine instance to a respective port in the first port group; and
 forwarding, by the virtual switch, network traffic addressed to one of the virtual network interfaces in the first port group to a second port group based on one of the network policies, wherein a first one of the network policies is a span rule specifying to copy network traffic addressed to one of the virtual network interfaces in the first port group to an active port in the second port group.

8. The computing system of claim 7, wherein a second one of the network policies is a redirect rule specifying to redirect network traffic addressed to one of the virtual network interfaces in the first port group to an active port in the second port group.

9. The computing system of claim 8, wherein the active port in the second port group connects the virtual switch to a virtual machine instance providing at least one of a firewall service, and an intrusion prevention system (IPS) for the plurality of virtual machine instances connected to the ports in the first port group.

10. The computing system of claim 7, wherein the active port in the second port group connects the virtual switch to a virtual machine instance providing at least one of a firewall service, an intrusion detection system (IDS), and a network traffic monitoring service for the plurality of virtual machine instances connected to the ports in the first port group.

11. The computing system of claim 7, wherein the operation further comprises:
   receiving, at the virtual switch, a frame addressed to one of the virtual network interfaces in the first port group;
   identifying the network policies in the port profile associated with the first port group; and
   forwarding, by the virtual switch, the frame addressed to the virtual network interface based on the network policies.

12. The computing system of claim 7, wherein the operation further comprises:
   migrating one of the virtual machine instances from the computer server to a second computer server;
   connecting the virtual network interface on the migrated virtual machine instance to a port group on a virtual switch on the second computer server; and
   forwarding network traffic addressed to the migrated virtual network interface based on a second network policy associated the with port group on the virtual switch on the second computer server.

13. A non-transitory computer-readable storage medium, containing a virtual switch program, which, when executed on a processor, performs an operation, comprising:
   assigning a port profile to a first port group on a virtual switch executing on a computer server hosting a plurality of virtual machine instances, wherein the port profile includes network policies;
   connecting a virtual network interface on each virtual machine instance to a respective port in the first port group; and
   forwarding network traffic addressed to one of the virtual network interfaces in the first port group to a second port group based on one of the network policies, wherein a first of the network policies is a span rule specifying to copy network traffic addressed to one of the virtual network interfaces in the first port group to an active port in the second port group.

14. The non-transitory computer-readable storage medium of claim 13, wherein a second one of the network policies is a redirect rule specifying to redirect network traffic addressed to one of the virtual network interfaces in the first port group to an active port in the second port group.

15. The non-transitory computer-readable storage medium of claim 14, wherein the active port in the second port group connects the virtual switch to a virtual machine instance providing at least one of a firewall service and an intrusion prevention system (IPS) for the plurality of virtual machine instances connected to the ports in the first port group.

16. The non-transitory computer-readable storage medium of claim 13, wherein the active port in the second port group connects the virtual switch to a virtual machine instance providing at least one of a firewall service, an intrusion detection system (IDS), and a network traffic monitoring service for the plurality of virtual machine instances connected to the ports in the first port group.

17. The non-transitory computer-readable storage medium of claim 13, wherein the operation further comprises:
   receiving, at the virtual switch, a frame addressed to one of the virtual network interfaces in the first port group;
   identifying the network policies in the port profile associated with the first port group; and
   forwarding, by the virtual switch, the frame addressed to the virtual network interface based on the network policies.

18. The non-transitory computer-readable storage medium of claim 13, wherein the operation further comprises:
   migrating one of the virtual machine instances from the computer server to a second computer server;
   connecting the virtual network interface on the migrated virtual machine instance to a port group on a virtual switch on the second computer server; and
   forwarding network traffic addressed to the migrated virtual network interface based on a second network policy associated with the port group on the virtual switch on the second computer server.

19. A method, comprising:
   assigning a port profile to a first port group on a virtual switch executing on a computer server hosting a plurality of virtual machine instances, wherein the port profile includes network policies;
   connecting a virtual network interface on each virtual machine instance to a respective port in the first port group; and
   forwarding network traffic addressed to one of the virtual network interfaces in the first port group to a second port group based on one of the network policies, wherein a first one of the network policies is a redirect rule specifying to redirect network traffic addressed to one of the virtual network interfaces in the first port group to an active port in the second port group.

20. The method of claim 19, wherein the active port in the second port group connects the virtual switch to a virtual machine instance providing at least one of a firewall service and an intrusion prevention system (IPS), for the plurality of virtual machine instances connected to the ports in the first port group.

21. The method of claim 19, further comprising:
   receiving, at the virtual switch, a frame addressed to one of the virtual network interfaces in the first port group;
   identifying the network policies in the port profile associated with the first port group; and
   forwarding, by the virtual switch, the frame addressed to the virtual network interface based on the network policies.

22. The method of claim 19, further comprising:
   migrating one of the virtual machine instances from the computer server to a second computer server;
   connecting the virtual network interface on the migrated virtual machine instance to a port group on a virtual switch on the second computer server; and
   forwarding network traffic addressed to the migrated virtual network interface based on a second network policy associated with the port group on the virtual switch on the second computer server.

* * * * *